United States Patent [19]

Debons

[11] Patent Number: 4,821,803

[45] Date of Patent: Apr. 18, 1989

[54] HIGH SALINITY POLYMER DRIVE FOR SURFACTANT FLOODING SYSTEMS

[75] Inventor: Francis E. Debons, Richmond, Tex.

[73] Assignee: Texaco Inc., White Plains, N.Y.

[21] Appl. No.: 67,070

[22] Filed: Jun. 29, 1987

[51] Int. Cl.$^4$ .............................................. E21B 43/22
[52] U.S. Cl. .................................... 166/273; 166/274; 252/8.554
[58] Field of Search .............................. 166/273, 275; 252/8.554

[56] References Cited

U.S. PATENT DOCUMENTS

| | | | |
|---|---|---|---|
| 3,515,214 | 6/1970 | Finch | 166/272 |
| 3,658,130 | 4/1972 | Davis, Jr. et al. | 166/273 |
| 3,707,187 | 12/1972 | Knight | 166/273 X |
| 4,008,766 | 2/1977 | Savins | 166/273 |
| 4,249,608 | 2/1981 | Carter | 166/273 X |
| 4,434,062 | 2/1984 | Oswald et al. | 252/8.554 |
| 4,547,224 | 10/1985 | Schilling | 252/311.5 X |
| 4,548,721 | 10/1985 | Debons et al. | 252/8.554 |
| 4,561,901 | 12/1985 | Schilling | 252/311.5 X |
| 4,667,740 | 5/1987 | Maddox, Jr. | 166/273 X |

OTHER PUBLICATIONS

SPE Paper No. 14292, Minssieux, L., "Surfactant Flooding with Hard Water: A Case Study Solved by HLB Gradient," presented 9/22-25/85 at 60th Annual Conference, Las Vegas.

Primary Examiner—George A. Suchfield
Attorney, Agent, or Firm—Jack H. Park; Kenneth R. Priem; Harold J. Delhommer

[57] ABSTRACT

The invention is a method of recovering hydrocarbons from an underground hydrocarbon formation penetrated by at least one injection well and at least one production well, in which a saline polymer slug containing about 0.1% to about 3.0% of a drive fluid additive is injected into the formation after the injection of a saline surfactant slug. The drive fluid additive has the structure:

$$R(C_2H_4O)_nH_y(SO_3M)_x$$

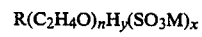

where R is a phenol, an alkylphenol having up to about 4 carbon atoms in the alkyl chain, or the product of reduction of lignin in the presence of carbon monoxide or hydrogen at a temperature greater than about 200° C. and a pressure greater than about 100 psi, n has an average value of about 5 to about 30, x is 0 or 1, y is 1 if x is O, y is O if x is 1, and M is an alkali metal or ammonium ion.

23 Claims, No Drawings

HIGH SALINITY POLYMER DRIVE FOR SURFACTANT FLOODING SYSTEMS

BACKGROUND OF THE INVENTION

The invention relates to the recovery of oil from subterranean formations by surfactant flooding operations. More particularly, the invention concerns the use of ethoxylated phenol and the ethoxysulfated phenol additives to polymer slugs which permit the use of a high salinity polymer drive following a surfactant slug.

Investigations of ways to increase oil recovery by improving the displacement ability of a water flood have produced useful surfactants which reduce the interfacial tension between the oil and water in the reservoir. With lower interfacial tension, oil that is trapped in the pore structure can disperse into the water as smaller and more easily deformable droplets. Many types of surfactants have been investigated and the choice of which surfactant to employ in a water flood operation is dependent upon the conditions in the reservoir, as well as the cost and availability of the surfactants.

Most water flood operations have employed a petroleum sulfonate as a sole surfactant, or at least a major component of a mixture of surfactants. Synthetic alkylaryl sulfonates and alkyl sulfonates and sulfates have been proposed as oil recovery surfactants. Sulfonates are preferred because they have a better high temperature stability than the sulfates. These surfactants are all classified as organic sulfonates and are usually metal salts of alkylbenzene sulfonate containing 12 to 30 carbon atoms, but may also be aliphatic sulfonates or alkylated naphthalene sulfonates. These surfactants have an equivalent weight that ranges from 320 to 700 g/mole.

To combat layering and precipitation problems in high salinity applications, a material with both water-soluble and oil soluble characteristics is usually added to organic sulfonate surfactant mixtures. When used in surfactant flooding, these materials are generally referred to as "solubilizers" or "cosurfactants" and often constitute the most expensive component in a surfactant mixture. Conventional solubilizers are sulfate or sulfonate salts of polyethoxylated alcohols or alkyl phenols. The amount of solubilizer required depends on the amount of and types of organic sulfonate surfactants employed in the water flood operation. A minimum amount of solubilizer is required to prevent the surfactants from precipitating from the flood water The choice of the solubilizer employed is dependent on the choice of surfactants to be used and the salinity of the flood water. Surfactant quantity is a function of the reservoir's size and other characteristics. The concentration of surfactant components in the system is usually 1% to 6% expressed on an active surfactant basis. The surfactant slug is usually made up in high salinity brine and the polymer slug in fresh water.

Generally, a surfactant slug is followed by a polymer drive fluid or a polymer slug. Unfortunately, surfactant slug formulations invariably perform more efficiently when followed by fresh water polymer slugs. Because of the higher cost and limited availability of fresh water, the industry has devoted considerable effort in attempts to discover surfactant and polymer systems which will perform well with high salinity surfactant and polymer slugs.

U.S. Pat. No. 3,437,140 disclosed a postflush to a surfactant slug which contained a relatively high salinity. This postflush slug contained some of the surfactant from the surfactant slug to build a second bank of surfactant to displace additional oil. U.S. Pat. No. 3,637,017 taught a method of adding alcohols such as isopropyl alcohol to slugs following surfactant slug to reduce surfactant depletion. But the system was not effective when salinity reached 1.5% sodium chloride. A "chasing surfactant" between the micellar solution and the aqueous drive was disclosed in U.S. Pat. No. 3,990,515 as a brine soluble anionic dispersing agent which was more water-soluble than the original surfactant. The chemicals mentioned were alpha olefin sulfonates, ethoxysulfates, and dialkyl sulfoccinates.

An aqueous postflush slug containing a nonionic solubilizer to reduce surfactant loss and improve oil recovery was disclosed in U.S. Pat. No. 4,276,933. The solubilizers used were ethoxylated and propoxylated alkyls having 9 to 16 carbon atoms and 1 to 20 ethylene oxide or propylene oxide groups. A similar approach was taught in SPE Paper No. 14292 by Minssieux, L., "Surfactant Flooding With Hard Water: A Case Study Solved by HLB Gradient," presented at the SPE 60th Annual Technical Conference in Las Vegas, Sept. 22–25, 1985. This solution to a high salinity drive problem injected a desorbing agent with the polymer slug having a higher hydrophile-lipophile balance (HLB) than the nonionic cosurfactant in the surfactant slug. The nonionic additives were disclosed as ethoxylated alcohols, specifically $C_{16}$–$C_{18}(EO)_6$ in the surfactant slug and $C_{16}$–$C_{18}(EO)_{20}$ in the high salinity polymer drive.

SUMMARY OF THE INVENTION

The invention is a method of recovering hydrocarbons from an underground hydrocarbon formation penetrated by at least one injection well and at least one production well, in which a saline polymer slug containing about 0.1% to about 3.0% of a drive fluid additive is injected into the formation after the injection of a saline surfactant slug. The drive fluid additive has the structure:

$$R(C_2H_4O)_nH_y(SO_3M)_x$$

where R is a phenol, an alkylphenol having up to about 4 carbon atoms in the alkyl chain, or the product of reduction of lignin in the presence of carbon monoxide or hydrogen at a temperature greater than about 200° C. and a pressure greater than about 100 psi, n has an average value of about 5 to about 30, x is 0 or 1, y is 1 if x is O, y is O if x is 1, and M is an alkali metal or ammonium ion.

DETAILED DESCRIPTION

Surfactant systems are conventionally injected into a reservoir to form a surfactant slug front followed by the injection of additional brine or water which may contain a mobility control agent. The surfactant slug of such a system may be between 0.05 to about 0.5 pore volumes, and preferably between about 0.1 to about 0.3 pore volumes in size. A typical surfactant system may contain (1) one or more petroleum sulfonates such as a water-soluble sulfonate having a relatively low equivalent weight, an oil soluble sulfonate having a relatively high equivalent weight or any other commercially available petroleum sulfonates; (2) a solubilizer or cosurfactant; (3) brine; and optionally, (4) a light hydrocarbon.

Because brine is readily available in the oil field, it is clearly the aqueous solvent of choice. Although surfactant systems may perform better in fresh water with a relatively low salinity, economics mandate the use of field brines wherever possible. Consequently, surfactant systems are tailored to provide acceptable recoveries with the use of a brine solvent.

Most enhanced oil recovery surfactant systems have fresh water polymer drives. This is despite the extra cost associated with injecting large quantities of fresh water instead of brine. Most surfactant systems require the salinity gradient provided by a fresh water polymer drive for optimum oil recovery. Generally, the recovery efficiency of produced oil is greatly diminished by the use of a less expensive high salinity polymer drive.

The present invention proposes the use of a surfactant system wherein a relatively high salinity polymer drive may be used to push a surfactant slug through a hydrocarbon formation while still achieving high recovery efficiencies. The invention requires the injection of a polymer slug containing about 0.1% to about 3.0% by weight of a drive fluid additive so as to allow the use of brine in polymer drive fluids. The drive fluid additive preferably exists in the polymer slug in a concentration of about 0.4% to about 2.0% by weight and has the structure $$R(C_2H_4O)_nH_y(SO_3M)_x,$$

where R is phenol, an alkylphenol having up to about 4 carbon atoms in the alkyl chain, or the product or reduction of lignin in the presence of carbon monoxide or hydrogen at a temperature greater than about 200° C. and a pressure greater than about 100 psi, n has an average value of about 5 to about 30 or more, x is 0 or 1, y is 1 if x is 0, y is 0 if x is 1, and M is an alkali metal or ammonium ion.

The average number of ethylene oxide groups may be larger than 30 if the overall compound still retains some surfactant characteristics. Although a greater number of ethylene oxide groups will increase the brine solubility of the compounds used in the invention method, too many ethylene oxide groups may approach the result of polyethylene glycol (See Example 7) where the number of ethylene oxide groups overwhelms the hydrophobic tail groups. For example, a tail group comprised of lignin phenol should be able to accomodate a greater number of ethylene oxide groups than a phenol or isopropylphenol tail group before the hydrophobic tail group is overwhelmed by an increasingly larger number of ethylene oxide groups.

The preferred drive fluid additives are phenol ethoxylated with an average number of 6 to 20 ethylene oxide groups and lignin phenol ethoxylated with an average of about 6 to about 20 ethylene oxide groups. The phenol ethoxylated with 6 to 8 ethylene oxide groups and the lignin phenols ethoxylated with 6 to 14 ethylene oxide groups are the most preferred additives because of performance and cost.

The ethylene oxide groups in the drive fluid additive structure may also be a mixture of ethylene oxide and propylene oxide groups, provided that there are a predominant number of ethylene oxide groups to give water solubility to the entire alkoxylated compound. Thus, the invention drive fluid additive and claims herein include a structure wherein some propylene oxide groups may be substituted for some of the ethylene oxide groups, provided sufficient ethylene oxide groups are included for water solubility. When used within this application, the term "lignin phenol" refers to the reduction product of lignin which is reduced in the presence of carbon monoxide or hydrogen at a temperature greater than about 200° C. and a pressure greater than about 100 psi.

The reductive degradation of lignin under these selected conditions produces a complex mixture of low molecular weight lignin phenols that are generally derived from or based on a propylphenol structure which has high solubility in organic solvents. Analysis of the lignin phenol reaction product indicates an average molecular weight of about 300 and a range of about 150 to about 1000, compared to a propylphenol molecular weight of 136 and lignin molecular weight of 3000 to 15,000. It is believed that the lignin phenol product is composed of 2, 3, 4, or more propane phenols linked or fused together plus assorted methoxyls, hydroxyls and other oxygens. Whenever the phrase "lignin phenol" is used herein, it refers to the above product mixture and not propylphenol.

The reduction reaction is carried out by placing a lignin in contact with water. The lignin may be dissolved or slurried in aqueous medium at concentrations preferably ranging from about 5% to about 20% by weight. Sodium hydroxide or a similar compound may also be placed in the aqueous medium in a concentration of about 1% to about 15% by weight to increase lignin solubility. The reducing agent is injected into the reaction vessel to blanket the reduction reaction mixture at an initial pressure greater than about 100 psi, preferably greater than about 500 psi. The reducing gas is preferably carbon monoxide or hydrogen or a mixture of both.

A pasting oil can be used as the solvent for the lignin reduction reaction. This embodiment does away with the need for a later separation step from water in some cases before proceeding with the final reactions. But it is still necessary to contact the lignin with a relatively small amount of water for an effective reduction to take place.

A catalyst may be employed to increase the yield. A ferrous salt is the preferred catalyst for hydrogenation of lignosulfonate. Other metal ions which may be used to catalyze the lignosulfonate hydrogenation are: cobalt, molybdenum, nickel and aluminum. When it is desired to reduce kraft lignin, alkali lignin, or desulfonated lignosulfonate by hydrogenation, it is preferred to use about 1% to about 15% by weight of a Raney nickel catalyst, based on the weight of the kraft lignin.

In general, the hydrogen reduction reaction should be allowed to proceed at reaction temperature and pressure for a period of about 30 minutes to about 5 hours and the carbon monoxide reduction for a time period of about 15 minutes to about 2 hours. The oil soluble lignin phenols can then be extracted from the reduction mixture with organic solvent. Preferred solvents are ether, diethylether, tetrahydrofuran, benzene and toluene. The lignin phenols may then be ethoxylated and sulfated by means known in the art.

The reduction of lignin by hydrogen and carbon monoxide and their ethoxylation and sulfation is discussed in detail in U.S. patent application Ser. No. 946,270, filed Dec. 24, 1986, now U.S. Pat. No. 4,729,040, the disclosure of which is incorp reference.

The invention as claimed requires the injection of about 0.05 to about 0.5 pore volumes of an aqueous surfactant slug having a concentration of about 0.1% to about 6.0% active component, and the injection of at least 0.15 pore volumes, preferably at least 0.2 pore volumes, and most preferably, at least 0.4 pore volumes of an aqueous drive fluid comprising about 0.01% to about 0.5% of a viscosity enhancing polymer, preferably a polysaccharide. The aqueous drive slug will also contain about 0.1 to about 3.0% by weight of the drive fluid additive, and preferably contain at least 4000 ppm TDS of dissolved salt. The invention is effective even when the salt concentration of the drive fluid is 20,000 ppm TDS or higher.

Because surfactant floods in the field do not have the same sweep efficiency as laboratory corefloods, polymer drives of about 0.5 pore volumes to about 1 pore volume or higher are usually employed. This invention may be practiced in the field by including the drive fluid additive in all of the injected drive fluid, or in the first portion of the drive fluid injected, followed by drive fluid without the drive fluid additive. Consequently, by injecting drive fluid containing the drive fluid additive for at least 0.15 pore volumes, and following this initial slug with at least 0.25 pore volumes of aqueous drive fluid without the drive fluid additive, the amount and cost of drive fluid additive used in the invention method can be reduced.

The drive fluid additive permits the use of relatively high salinity mobility control polymer drives without sacrificing oil recovery. In other words, high salinity reservoir water such as the 68,000 ppm TDS brine and 80,000 ppm TDS brine of the following examples, may be used to formulate the polymer drive slug instead of having to use a relatively fresh water. Preferably, the aqueous surfactant fluid and the aqueous drive fluid will both be made from the field water found on location even though such field water may have a relatively high salinity.

Petroleum sulfonate and synthetic sulfonate surfactant systems known in the art may be employed in the surfactant slug of the invention method. One preferred surfactant system for use with the invention comprises a lignin, an amine, and a petroleum or synthetic sulfonate surfactant. A solubilizer or a cosurfactant may be optionally employed. These active components should be present in total in the surfactant slug in a concentration of about 0.1% to about 6% by weight.

Component concentrations are usually expressed as a relative percent of the total active surfactant in the system. The lignin should be present in the relative concentration of about 10% to about 80% by weight, preferably about 20% to about 60% by weight, and may be a modified kraft lignin usually oxidized or sulfonated, although a lignosulfonate is preferred. A non-modified kraft lignin is not effective since it lacks water solubility. As used herein, the term lignin refers to those modified lignins which are effective in the invention system.

the amine is a primary amine having about eight to about eighteen carbon atoms. Tallow amine is preferred. It should be present in the relative concentration of about 1% to about 20% by weight, preferably about 4% to about 11% by weight. The lignin/amine components of the system are present in a cumulative relative concentration of about 20% to about 85%.

The surfactant slug in the lignin amine system must also contain about 10% to about 75% by weight (relative concentration), preferably about 40% to about 70% by weight of a water-soluble surfactant, such as a synthetic or petroleum sulfonate surfactant having a relatively low equivalent weight of about 200 to about 400. They may function as a cosurfactant or solubilizer. An additional cosurfactant or solubilizer may also be employed depending upon the formation desired to be flooded and the system characteristics.

The following examples will further illustrate the novel polymer drive system of the present invention. These examples are given by way of illustration and not as limitations to the scope of the invention. Thus, it should be understood that the composition and amounts of the surfactant and polymer system may be varied to achieve similar results within the scope of the invention.

EXAMPLES 1-21

Berea sandstone corefloods were performed in cells measuring 2×2×12 inches. The corefloods used an injection brine of 68,000 ppm TDS and about 3700 ppm of divalent ions. A Southern Illinois crude having an API gravity of about 37° was employed. The surfactant floods were performed on cores oil saturated at a frontal advance rate of 10 ft/day, water flooded at 5 ft/day and chemical flooded at 1 ft/day. Polymer drives were continuous until the end of oil production.

The lignin amine surfactant slug employed in most of the Examples was a 0.2 pore volume slug formulated in the injection brine of 68,000 ppm TDS containing by weight: 0.3% of a tallow amine, 0.81% of a lignosulfonate, 1.35% of a petroleum sulfonate having an average equivalent weight of about 300 to 400, and 0.54% of an ethoxylated anionic surfactant having an alkyl chain of 12 to 14 carbon atoms.

The polymers employed were Flocon 4800M, a trademarked xanthan polysaccharide sold by Pfizer and NalFlo 550, a trademarked polyacrylamide sold by Nalco Chemical Co. A 0.2% by weight concentration of Flocon 4800M and a 0.15% by weight concentration of NalFlo 550 give a 150 cp viscosity when prepared in simulated fresh water and measured at 3 rpm with a Brookfield UL Adapter. The viscosity of 0.2% Flocon 4800M increased to about 170-190 when measured in 68,000 ppm TDS brine.

Twenty-one runs were performed with varying polymer drive additives. For Example 1, a simulated fresh water was employed containing about 330 ppm TDS salinity, about 80 ppm divalent ion concentration and the 0.15% NalFlo 550 polyacrylamide. Examples 2-21 contained 0.2% Flocon 4800M. The polymer slugs of Examples 3-21 were formulated in a brine drive of 68,000 ppm TDS. The results are summarized below in Table 1.

Trycol NP-9 is a trademarked nonylphenol ethoxylate having an average of nine ethylene oxide groups sold by Emery Industries. Trycol NP-15 is a trademarked nonylphenol ethoxylate having an average of fifteen ethylene oxide groups sold by Emery Industries. Alfonic 1412-60 is a trademarked alcohol ethoxylate having 60% by weight ethylene oxide sold by Vista Chemical Co.

TABLE 1

| COREFLOOD RESULTS FOR 1% ADDITIVES IN BRINE POLYMER DRIVE | | |
|---|---|---|
| Example | Additive | $E_R$, % |
| 1 | None (NalFlo 550 in Fresh Water) | 67 |
| 2 | None (17,000 ppm TDS Brine) | 21 |
| 3 | None | 9 |
| 4 | Sodium lignosulfonate | 10 |
| 5 | Alcohol ethoxysulfate | 45 |
| 6 | Isobutyl Alcohol | 15 |

TABLE 1-continued

COREFLOOD RESULTS FOR 1% ADDITIVES IN BRINE POLYMER DRIVE

| Example | Additive | $E_R$, % |
|---|---|---|
| 7 | Polyethylene Glycol (MW of 400) | 16 |
| 8 | Trycol NP-9 | 51 |
| 9 | Trycol NP-15 | 41 |
| 10 | Hexanol(EO)$_6$ | 50 |
| 11 | Alfonic 1412-60 | 55 |
| 12 | p-tert-butylphenol(EO)$_8$ | 61 |
| 13 | p-tert-butylphenol(EO)$_{10}$ | 62 |
| 14 | iso-propylphenol(EO)$_4$ | 21 |
| 15 | iso-propylphenol(EO)$_6$ | 60 |
| 16 | iso-propylphenol(EO)$_8$ | 64 |
| 17 | Phenol(EO)$_6$ | 65 |
| 18 | Phenol(EO)$_8$ | 70 |
| 19 | Phenol(EO)$_8$ (0.5% Additive) | 67 |
| 20 | iso-propylphenol(EO)$_6$SO$_3$Na | 60 |
| 21 | iso-propylphenol(EO)$_8$SO$_3$Na | 66 |

As shown in Table 1, a wide variety of results was obtained with different additives. Examples 1, 2 and 3 show the dramatic decrease in oil recovery when saline water was used for a polymer drive after a high salinity surfactant slug. Oil recovery dropped by more than two-thirds in Example 2 when the drive fluid salinity was raised to about 17,000 ppm TDS. And oil recovery dropped to an insignificant 9% in Example 3 when formation salinity of 68,000 ppm TDS was used with the polymer. Some additives like polyethylene glycol and isobutyl alcohol were barely more effective than polymer in brine without an additive. Conventional nonionic surfactants such as Alfonic 1412-60 and ethoxylated nonylphenols were not very effective in producing oil. Unmodified lignosulfonate was ineffective and a conventional alcohol ethoxysulfate cosurfactant having about 13 carbon atoms was only marginally beneficial.

The best results were achieved with the invention drive fluid additives of Examples 12-21. The highest oil recoveries were achieved with the ethoxylated phenols of Examples 17-19. In Example 18 where phenol was ethoxylated with an average of eight ethylene oxide groups, a higher oil recovery (70%) was achieved with the brine polymer drive than with the fresh water polymer drive of Example 1.

The ethoxysulfated salts of isopropylphenol in Examples 20 and 21 gave recoveries equivalent to the nonsulfated additives of Examples 15 and 16. However, the nonsulfated surfactants hold more promise because the sulfation step adds cost to the additives without significantly improving their performance.

EXAMPLES 22-25

These corefloods were performed to investigate the advantage of using a fresh water polyacrylamide buffer slug between the surfactant slug and the aqueous drive fluid. Examples 22-25 noted in Table 2 employed the same procedure and the same surfactant slug as Examples 1-21. The recovery efficiency of Example 22 dropped drastically when the polyacrylamide fresh water drive was changed to a polysaccharide brine drive. Example 24 shows the effect of adding the fresh water buffer slug of 0.2 pore volumes of polyacrylamide between the surfactant slug and the polysaccharide brine drive. Recovery efficiency was 68%, almost as much as the original system of Example 22. The combination of the fresh water polyacrylamide buffer slug and 1% drive fluid additive, iso-propylphenol (EO)$_8$ is illustrated in Example 25 in which the recovery efficiency was 79%. This recovery efficiency exceeded that of the original fresh water polymer drive system.

TABLE 2

COMBINATION OF POLYACRYLAMIDE BUFFER WITH DRIVE FLUID ADDITIVE

| Example | Buffer, $V_p$ | Polymer Drive | $E_R$, % |
|---|---|---|---|
| 22 | none | N550/fresh water | 78 |
| 23 | none | 4800/brine | 9 |
| 24 | N550/fresh, 0.2 | 4800/brine | 68 |
| 25 | N550/fresh, 0.2 | 4800/brine + 1% iso-propylphenol (EO)$_8$ | 79 |

EXAMPLES 26-30

The procedure of Examples 1-21 was followed for Examples 26-30 of Table 3. Two ethoxylated lignin phenols and three ethoxysulfated lignin phenols were tested as 1% drive fluid additives in the brine polymer drive of 68,000 ppm TDS. These compounds are considered important because they are produced by ethoxylating the low molecular weight lignin phenols obtained from the high temperature reduction of lignin with carbon monoxide or hydrogen gas. Because these compounds are obtained by an inexpensive reduction process from lignin a relatively inexpensive feedstock, it is believed they have a high potential for enhanced oil recovery use.

All five lignin phenol compounds tested gave more than 67% recovery efficiency, results equivalent to or surpassing the best of the other invention drive fluid additive compounds tested. Examples 29 and 30 gave recovery efficiencies of 80% and 82%, respectively, the highest of any fresh water or brine system tested.

TABLE 3

COREFLOOD RESULTS FOR 1% ETHOXYLATED AND ETHOXYSULFATED LIGNIN PHENOL ADDITIVES IN BRINE POLYMER DRIVE

| Example | Additive | $E_R$, % |
|---|---|---|
| 26 | Lignin Phenol(EO)$_{12}$ | 75 |
| 27 | Lignin Phenol(EO)$_6$SO$_3$Na | 67 |
| 28 | Lignin Phenol(EO)$_7$SO$_3$Na | 70 |
| 29 | Lignin Phenol(EO)$_{12}$SO$_3$Na | 80 |
| 30 | Lignin Phenol (EO)$_{13}$ | 82 |

EXAMPLES 31-36

A 5% concentration by weight lignin amine surfactant system was employed for Examples 31-36 reported in Table 4. The salinity of the surfactant slug was also raised to 120,000 ppm TDS and the drive fluid salinity was raised to 80,000 ppm TDS.

The 5% lignin amine surfactant slug was comprised of 0.33% of a tallow amine, 2.33% of a sodium lignosulfonate, 1.87% of a paraffinic secondary alkane sulfonate having about thirteen to seventeen carbon atoms and 0.47% of an ethoxysulfate alcohol cosurfactant. The polymer slug was a continuous 0.125% Flocon 4800 in 80,000 ppm TDS brine containing phenol (EO)$_8$ at the levels indicated in Table 4.

TABLE 4

| COREFLOODS WITH 5% LIGNIN AMINE SYSTEM | | | | |
|---|---|---|---|---|
| | Polymer | Phenol (EO)$_8$ | | Oil Recovery |
| Example | Salinity | Conc., wt % | PV Used | $E_R$, % | $\Delta So$ |
| 31 | Fresh | 0 | 0 | 76 | 0.27 |
| 32 | 80,000 ppm | 0 | Continuous | 18 | 0.07 |
| 33 | 80,000 ppm | 1 | Continuous | 69 | 0.25 |
| 34 | 80,000 ppm | 1 | 0.25* | 62 | 0.22 |

TABLE 4-continued
COREFLOODS WITH 5% LIGNIN AMINE SYSTEM

| Example | Polymer Salinity | Phenol (EO)$_8$ Conc., wt % | Phenol (EO)$_8$ PV Used | Oil Recovery $E_R$, % | Oil Recovery $\Delta S_o$ |
|---|---|---|---|---|---|
| 35 | 80,000 ppm | 1.5 | 0.25* | 66 | 0.25 |
| 36 | 80,000 ppm | 2 | 0.25* | 71 | 0.26 |

*Polymer continued without additive after 0.25 pore volumes with additive.

This solubilized 5% lignin amine surfactant system required a fresh water polymer drive for optimum oil recovery as is illustrated in Example 31. The drastic drop in recovery efficiency which occurred from a fresh water polymer drive to a high salinity polymer drive is illustrated by the drop to 18% recovery efficiency in Example 32. The addition of varying amounts of the invention drive fluid additive resulted in different recovery efficiencies with the use of 0.25 PV of 2% phenol (EO)$_8$ in the high salinity polymer drive yielding a 71% recovery efficiency.

EXAMPLES 37-40

In Examples 37-40 of Table 5, the lignin amine surfactant system was changed to a petroleum sulfonate surfactant system. A 0.2 pore volume 3% by weight surfactant slug was employed followed by various polymer drives. The surfactant slug was comprised of 1.08% TRS-18, a trademarked petroleum sulfonate having an equivalent weight of about 500 sold by Witco Chemical Co., 1.08% TRS-40, a trademarked petroleum sulfonate having an average equivalent weight of about 340 sold by Witco Chemical Co., and 0.84% of an alcohol ethoxysulfate cosurfactant having an alkyl chain of about 13 carbon atoms.

TABLE 5
POLYMER DRIVE EFFECT ON 3% PETROLEUM SULFONATE SYSTEM

| Example | Polymer Drive | $E_R$, % |
|---|---|---|
| 37 | 0.15% NalFlo 550 in Fresh Water | 75 |
| 38 | 0.20% Flocon 4800 M in Fresh Water | 76 |
| 39 | 0.20% Flocon 4800 M in 68,000 ppm TDS Brine | 37 |
| 40 | 0.20% Flocon 4800 M + 1% iso-propylphenol (EO)$_8$ in 68,000 ppm TDS Brine | 72 |

Example 39 shows the oil recovery drop-off when the polymer slug was changed from fresh water to the injection brine of 68,000 ppm TDS. The use of 1% invention drive fluid additive isopropylphenol (EO)$_8$ in Example 40 raised the recovery efficiency back to a value almost equal to the fresh water system of Example 38. These corefloods demonstrate that the invention drive fluid additives are equally effective with petroleum sulfonate based systems as with the lignin amine systems.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from an underground hydrocarbon formation penetrated by at least one injection well and at least one production well, which comprises:
   injecting into the formation through an injection well about 0.05 to about 0.5 pore volumes of an aqueous surfactant slug having a concentration of about 0.1% to about 6.0% active component;
   injecting into the formation at least 0.15 pore volumes of an aqueous drive fluid comprising about 0.01% to about 0.5% of polysaccharide by weight and about 0.1% to about 3.0% of drive fluid additive by weight,
   said drive fluid additive having the structure $R(C_2H_4O)_nH_y(SO_3M)_x$ where R is the product of reduction of lignin in the presence of carbon monoxide or hydrogen at a temperature greater than about 200°°C. and a pressure greater than about 100 psi, n has an average value of about 5 to about 30, x is 0 or 1, y is 1 if x is O, y is O if x is 1, and M is an alkali metal or ammonium ion; and
   recovering hydrocarbons and other fluids from the formation through a production well.

2. A method of recovering hydrocarbons from an underground hydrocarbon formation penetrated by at least one injection well and at least one production well, which comprises:
   injecting into the formation through an injection well about 0.05 to about 0.5 pore volumes of an aqueous surfactant slug having a concentration of about 0.1% to about 6.0% active component;
   injecting into the formation at least 0.15 pore volumes of a saline aqueous drive fluid comprising about 0.01% to about 0.5% of polysaccharide by weight and about 0.1% to about 3.0% of drive fluid additive by weight and a salinity greater than about 4000 ppm TDS,
   said drive fluid additive having the structure $R(C_2H_4O)_nH$ where R is phenol, an alkylphenol having up to about 4 carbon atoms in the alkyl chain, or the product of reduction of lignin in the presence of carbon monoxide or hydrogen at a temperature greater than about 200° C. and a pressure greater than about 100 psi, and n has an average value of about 5 to about 30; and
   recovering hydrocarbons and other fluids from the formation through a production well.

3. The method of claim 2, wherein n has an average value of about 6 to about 20.

4. The method of claim 2, wherein R is phenol, and n has an average value of about 6 to about 8.

5. The method of claim 2, wherein R is iso-propylphenol, and n has an average value of about 6 to about 20.

6. The method of claim 2, wherein R is p-tert-butylphenol, and n has an average value of about 6 to about 20.

7. The method of claim 2, wherein the drive fluid additive comprises about 0.4% to about 2.0% by weight of the aqueous drive fluid.

8. The method of claim 2, wherein the surfactant slug comprises a petroleum sulfonate system.

9. The method of claim 2, wherein the surfactant slug comprises a synthetic sulfonate system.

10. The method of claim 2, wherein at least 0.4 pore volumes of saline aqueous drive fluid is injected into the formation after the surfactant slug.

11. The method of claim 2, further comprising the injection of at least 0.25 pore volumes of saline aqueous drive fluid comprising about 0.01% to about 0.5% polysaccharide by weight after the injection of at least 0.15 pore volumes of the drive fluid comprising polysaccharide and the drive fluid additive.

12. A method of recovering hydrocarbons from an underground hydrocarbon formation penetrated by at least one injection well and at least one production well, which comprises:
 injecting into the formation through an injection well about 0.05 to about 0.5 pore volumes of an aqueous surfactant slug having a concentration of about 0.1% to about 6.0% active component,
 said surfactant slug comprising lignin, a primary amine having about eight to about eighteen carbon atoms and a sulfonate surfactant having an equivalent weight between about 200 and about 400 in the relative concentrations of about 1% to about 20% by weight of amine, about 10% to about 80% by weight of lignin, and about 10% to about 75% by weight of sulfonate surfactant;
 injecting into the formation at least 0.15 pore volumes of a saline aqueous drive fluid comprising about 0.01% to about 0.5% of polysaccharide by weight and about 0.1% to about 3.0% of drive fluid additive by weight and a salinity greater than about 4000 ppm TDS,
 said drive fluid additive having the structure $$R(C_2H_4O)_nH_y(SO_3M)_x,$$

where R is phenol, an alkylphenol having up to about 4 carbon atoms in the alkyl chain, or the product of reduction of lignin in the presence of carbon monoxide or hydrogen at a temperature greater than about 200° C. and a pressure greater than about 100 psi, n has an average value of about 5 to about 30, x is 0 or 1, y is 1 if x is 0, y is 0 if x is 1, and M is an alkali metal or ammonium ion; and
 recovering hydrocarbons and other fluids from the formation through a production well.

13. The method of claim 12, wherein the lignin in the surfactant slug is lignosulfonate.

14. The method of claim 12, wherein the lignin in the surfactant slug is oxidized kraft lignin.

15. The method of claim 12, wherein the lignin in the surfactant slug is sulfonated kraft lignin.

16. The method of claim 12, wherein the amine is a tallow amine.

17. The method of claim 12, wherein the amine is present in a concentration of about 4.0% to about 11% relative to all active components in the surfactant slug.

18. The method of claim 12, wherein the lignin is present in a concentration of about 20% to about 60% relative to all active components in the surfactant slug.

19. The method of claim 12, wherein the sulfonate surfactant slug further comprises about 40% to about 70% of a sulfonate relative to all active components in the surfactant slug.

20. The method of claim 12, wherein the sulfonate surfactant is a petroleum sulfonate.

21. The method of claim 12, wherein the sulfonate surfactant is a synthetic sulfonate.

22. A method of recovering hydrocarbons from an underground hydrocarbon formation penetrated by at least one injection well and at least one production well, which comprises:
 injecting into the formation through an injection well about 0.1 to about 0.3 pore volumes of an aqueous surfactant slug having a concentration of about 0.1% to about 6.0% active component;
 said surfactant slug comprising lignosulfonate, a tallow amine and a sulfonate surfactant in the relative concentrations of about 4% to about 11% by weight of tallow amine, about 20% to about 60% by weight of lignin, and about 40% to about 70% by weight of a sulfonate surfactant relative to all active components in the surfactant slug,
 said sulfonate surfactant having an equivalent weight of about 200 to about 400;
 injecting into the formation at least 0.2 pore volumes of a saline aqueous drive fluid comprising about 0.01% to about 0.5% of polysaccharide by weight, about 0.4% to about 2.0% by weight of a drive fluid additive, and a salinity greater than about 20,000 ppm TDS,
 said drive fluid additive having the structure $$R(C_2H_2O)_nH$$

where R is phenol, and n has an average value of about 6 to about 20; and
 recovering hydrocarbons and other fluids from the formation through a production well.

23. A method of recovering hydrocarbons from an underground hydrocarbon formation penetrated by at least one injection well and at least one production well, which comprises:
 injecting into the formation through an injection well about 0.1 to about 0.3 pore volumes of an aqueous surfactant slug having a concentration of about 0.1% to about 6.0% active component;
 said surfactant slug comprising lignosulfonate, a tallow amine and a sulfonate surfactant in the relative concentrations of about 40% to about 11% by weight of tallow amine, about 70% by weight of a sulfonate surfactant relative to all active components in the surfactant slug,
 said sulfonate surfactant having an equivalent weight of about 200 to about 400;
 injecting into the formation at least 0.2 pore volumes of a saline aqueous drive fluid comprising about 0.01% to about 0.5% of polysaccharide by weight, about 0.4% to about 2.0% by weight of a drive fluid additive, and a salinity greater than about 20,000 ppm TDS,
 said drive fluid additive having the structure $$R(C_2H_4O)_nH$$

where R is the product of reduction of lignin in the presence of carbon monoxide or hydrogen at a temperature greater than about 200° C. and a pressure greater than about 100 psi, and n has an average value of about 6 to about 20; and
 recovering hydrocarbons and other fluids from the formation through a production well.

* * * * *

UNITED STATES PATENT AND TRADEMARK OFFICE
CERTIFICATE OF CORRECTION

PATENT NO. : 4,821,803
DATED : April 18, 1989
INVENTOR(S) : Francis Eugene Debons It is certified that error appears in the above-identified patent and that said Letters Patent is hereby corrected as shown below:

Claim 1,
Column 10, line 14, delete "200··C. and substitute therefor --200°C.--.

Claim 23,
Column 12, line 42, delete "40%" and substitute therefor --4%--.

Signed and Sealed this

Twenty-eighth Day of November 1989

Attest:

JEFFREY M. SAMUELS

*Attesting Officer*        *Acting Commissioner of Patents and Trademarks*